ABSTRACT

United States Patent [19]
Jensen

[11] Patent Number: 5,866,676
[45] Date of Patent: *Feb. 2, 1999

[54] COPOLYIMIDES PREPARED FROM 3,4'-OXYDIANILINE AND 1,3-BIS(3-AMINOPHENOXY) BENZENE WITH 3,3', 4, 4'-BIPHENYLCARBOXYLIC DIANHYDRIDE

[75] Inventor: Brian J. Jensen, Williamsburg, Va.

[73] Assignee: The United States of America as represented by the United States National Aeronautics and Space Administration, Washington, D.C.

[*] Notice: The term of this patent shall not extend beyond the expiration date of Pat. No. 5,644,022.

[21] Appl. No.: 388,651

[22] Filed: Feb. 14, 1995

[51] Int. Cl.$^6$ .............................. C08G 69/26; C08G 73/10
[52] U.S. Cl. .......................... 528/353; 528/125; 528/128; 528/172; 528/173; 528/183; 528/185; 528/188; 528/220; 528/229; 428/411.1; 428/473.5; 526/935; 524/600; 524/607
[58] Field of Search ..................................... 528/188, 185, 528/183, 353, 220, 229, 173, 179, 172, 125, 128; 428/473.5, 411.1; 526/935; 524/607, 600

[56] References Cited

U.S. PATENT DOCUMENTS 4,595,548  6/1986  St. Clair et al. ..................... 528/183
4,837,300  6/1989  St. Clair et al. ..................... 528/353
4,895,972  1/1990  Stoakley et al. .................... 528/353
5,147,966  9/1992  St. Clair et al. ..................... 528/353
5,252,700  10/1993 Okikawa et al. ..................... 528/353
5,338,826  8/1994  St. Clair et al. ..................... 528/353
5,346,982  9/1994  Tamai et al. ........................ 528/353
5,428,102  6/1995  St. Clair ............................. 528/353

OTHER PUBLICATIONS

Polymer Preprint vol. 35, No. 1, 3, 1994, pp. 539–554, Bryant et al.

Primary Examiner—P. Hampton-Hightower
Attorney, Agent, or Firm—George F. Helfrich

[57] ABSTRACT

Polyimide copolymers were prepared by reacting different ratios of 3,4'-oxydianiline (ODA) and 1,3-bis(3-aminophenoxy)benzene (APB) with 3,3',4,4'-biphenylcarboxylic dianhydride (BPDA) and endcapping with an effective amount of a non-reactive endcapper. Within a narrow ratio of diamines, from ~50% ODA/50% APB to ~95% ODA/5% APB, the copolyimides prepared with BPDA have a unique combination of properties that make them very attractive for various applications. This unique combination of properties includes low pressure processing (200 psi and below), long term melt stability (several hours at 390° C.), improved toughness, improved solvent resistance, improved adhesive properties, and improved composite mechanical properties.

13 Claims, 1 Drawing Sheet

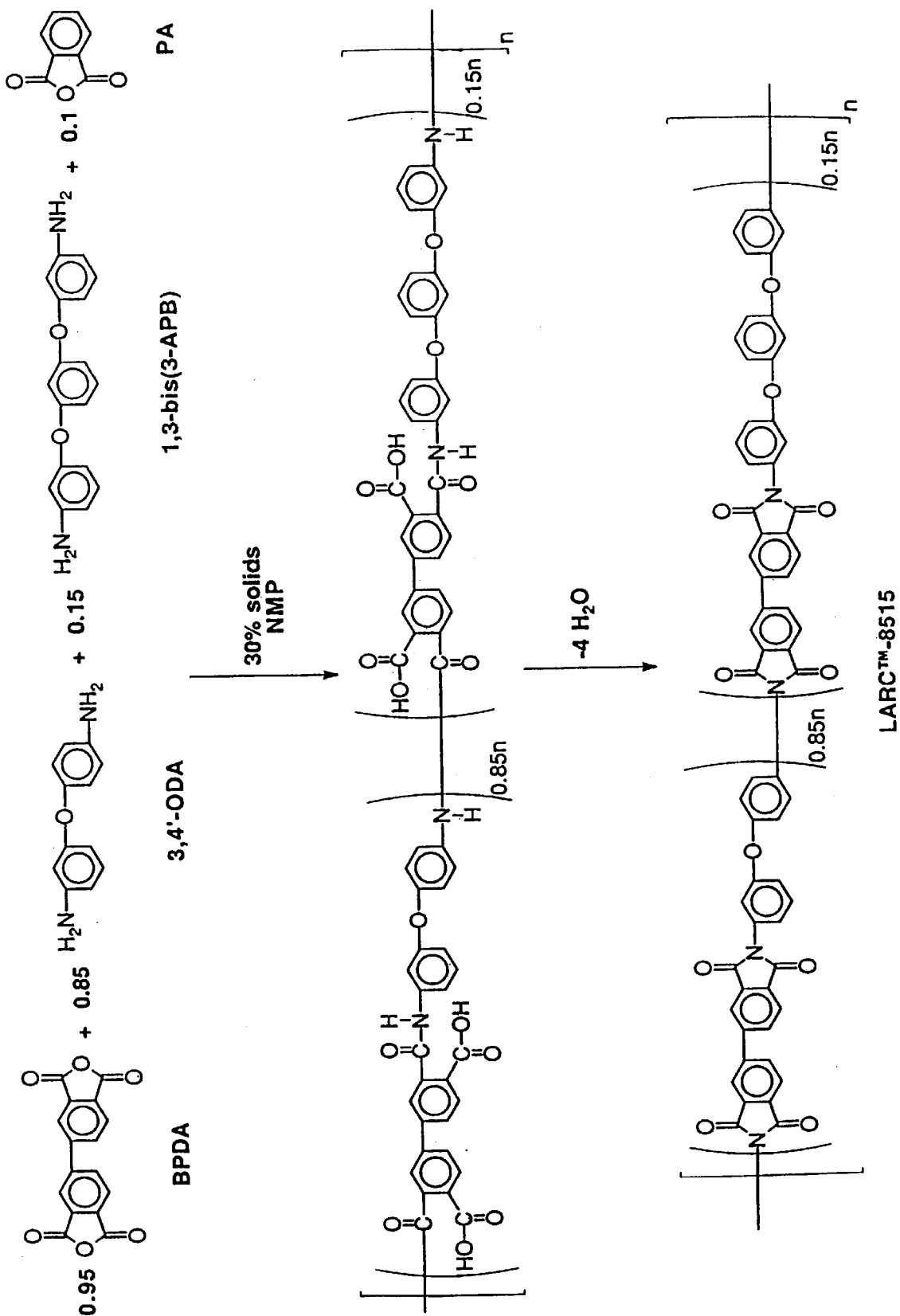

COPOLYIMIDES PREPARED FROM 3,4'-OXYDIANILINE AND 1,3-BIS(3-AMINOPHENOXY) BENZENE WITH 3,3', 4, 4'-BIPHENYLCARBOXYLIC DIANHYDRIDE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to high performance polymeric materials. The present invention relates particularly to polyimide copolymers that are useful as adhesives, composite matrices, moldings, films and coatings.

2. Description of Related Art

Wholly aromatic polyimides are known for their exceptional thermal, thermooxidative and chemical resistance, but are generally difficult to process as structural adhesives or composite matrices. Several polyimides such as Kapton® (DuPont), PI-2080 (Dow Chemical, licensed to Lenzing), XU-218 (Ciba-Geigy), Ultem®(General Electric) and LaRC™-TPI (Mitsui Toatsu) are commercially available and used as fibers, films, moldings, adhesives or composite matrices.

Currently available equipment to process polyimides into useful parts are limited in their pressure and temperature capability, and certain applications require co-curing of adhesives and composites with other structures such as foams or honeycombs. Because of the equipment limitations (especially autoclaves), it is extremely important to provide materials that are processable at 200 psi or below and 371° C. or below. Because of the foams and honeycombs that are being proposed for use in some applications, reductions in pressure below 200 psi are also very significant.

While improved processing conditions are very important, the polyimides must also display better mechanical and adhesive properties to meet the needs of many future applications. Especially important for these applications are properties measured at temperatures of 177° C. or slightly higher, for use over long time periods at those elevated temperatures.

Thermoplastic polymers currently available are either difficult to process into high quality parts or have limited mechanical performance at the elevated temperatures for short or long periods of time. The related art that comes closest to meeting the needs of future applications is a thermoplastic polyimide known as LARC™-IA, as described by St. Clair and Progar in U.S. Pat. No. 5,147,966. However, this polyimide requires higher processing conditions than desired and/or provides lower mechanical and adhesive properties than desired, depending on the tests performed.

A primary object of this invention is to provide polyimide copolymers which can be processed at low pressures to provide polyimides with improved solvent resistance, modulus and elevated use temperatures.

Another object is to provide polyimide copolymers with improved melt processability, that can be processed without the evolution of volatiles, that are melt stable at high temperatures, that have improved adhesive properties, and that have improved composite properties.

SUMMARY OF INVENTION

According to the present invention, polyimide copolymers were obtained by reacting different ratios of 3,4'-oxydianiline (ODA) and 1,3-bis(3-aminophenoxy)benzene (APB) with 3,3',4,4'-biphenylcarboxylic dianhydride (BPDA) and endcapping with an effective amount of a non-reactive endcapper such as phthalic anhydride (PA). Appropriate non-reactive endcappers are monofunctional anhydrides and monofunctional amines. Within a narrow ratio of diamines, from ~50% ODA/50% APB to ~95% ODA/5% APB, the copolyimides prepared with BPDA have a unique combination of properties that make them very attractive for various applications. This unique combination of properties includes low pressure processing (200 psi and below), long term melt stability (several hours at 390° C.), improved toughness (Table 4), improved solvent resistance (Table 5), improved adhesive properties (Table 5) and improved composite mechanical properties (Table 6). The general synthetic procedure for the preparation of a copolymer with 85% ODA and 15% APB at a theoretical molecular weight of ~9200 g/mole (5% stoichiometric offset) is shown in the single drawing figure. Polymers are designated by LaRC™ for Langley Research Center and a number which relates to the ratio of ODA to APB, i.e., LaRC™-8515 for the example above. Data for theoretical number average molecular weights ($M_n$), inherent viscosities ($n_{inh}$) and glass transition, melting and 5% weight loss temperatures are included in the following Table 1. Thin film properties are included in Table 2. Polymer processability data is included in Table 3. Fracture toughness and fracture energy are included in Table 4. Data for the titanium to titanium adhesive properties are included in Table 5. Data for composite properties are included in Table 6, and data for polymer melt viscosity is included in Table 7. The copolyimides of the present invention are accordingly eminently suitable as adhesives, composite matrices, moldings, films and coatings.

TABLE 1

Properties of Copolymers

| Copolymer (Theoretical Molecular Weight, Mn) | Inherent Viscosity, ηinh | Glass Transition Temperature, Tg (°C.) | Temperature at 5% Weight Loss, °C. Air | Temperature at 5% Weight Loss, °C. Nitrogen |
|---|---|---|---|---|
| LaRC ™-8515 (8500) | 0.41 | 230 | 509 | 515 |
| LaRC ™-8515 (9000) | 0.43 | 234 (324, 350) | 509 | 515 |
| LaRC ™-8515 (11600) | 0.47 | 248 (357) | 508 | 513 |
| LaRC ™-8515 (23400) | 0.68 | 252 | 511 | 519 |
| LaRC ™-5050 (11600) | 0.41 | 219 | 503 | 508 |
| LaRC ™-7030 (11600) | 0.49 | 230 | 497 | 499 |
| LaRC ™-955 (11600) | 0.54 | 254 (340, 373) | 502 | 513 |

TABLE 2

Thin Film Properties of Copolymers*.

| Copolymer | Test Temperature, °C. | Tensile Strength, Ksi | Tensile Modulus, Ksi | Elongation, % |
|---|---|---|---|---|
| LaRC ™-8515* | 25 | 21.9 | 492 | 83 |
| " | 150 | 12.7 | 312 | 92 |
| " | 177 | 11.3 | 301 | 109 |
| LaRC ™-7030* | 25 | 18.5 | 478 | 32 |
| | 177 | 9.1 | 340 | 77 |

TABLE 2-continued

Thin Film Properties of Copolymers*.

| Copolymer | Test Temperature, °C. | Tensile Strength, Ksi | Tensile Modulus, Ksi | Elongation, % |
|---|---|---|---|---|
| LaRC ™-955* | 25 | 19.2 | 555 | 17 |
|  | 177 | 10.0 | 400 | 40 |

*Theoretical number average molecular weight of 11600 g/mole

TABLE 3

Polymer Processability.

| Copolyimide (g/mole) | Pressure (psi) | Processability/Quality |
|---|---|---|
| LaRC ™-8515 (8500) | 85 | good/brittle |
| LaRC ™-8515 (9000) | 125 | excellent/tough |
| LaRC ™-8515 (11600) | 125 | good/tough |
| LaRC ™-8515 (23400) | 200 | poor/tough |
| LaRC ™-7030 (11600) | 125 | excellent/tough |
| LaRC ™-955 (11600) | 200 | poor/brittle |

TABLE 4

Fracture Toughness and Energy of LaRC ™-8515.

| Theoretical Molecular Weight, $M_n$ | Fracture toughness, psi $in^{1/2}$ | Fracture energy, in lbs/ $in^2$ |
|---|---|---|
| 8500 | 1100 | 2.4 |
| 9000 | 2700 | 14.6 |
| 11600 | 4000 | 32 |

TABLE 5

Adhesive Properties of LaRC ™-8515
Bonded 1 h at 371° C. under 85 psi.

| Test Temp, °C. | Exposure | Bondline thickness, mil | Strength, psi | Failure Mode |
|---|---|---|---|---|
| RT | none | 6–10 | 5720 | Coh |
| 177° C. | none | 5–7 | 4310 | 3 |
| 204° C. | none | 6–8 | 3360 | Coh |
| RT | MEK, 48 h | 7–11 | 5584 | 80% Coh |
| RT | Toluene, 48 h | 9–12 | 4675 | 50% Coh |
| RT | JP-5, 48 h | 6–10 | 6127 | 80% Coh |
| RT | Hydraulic Fluid, 48 h | 6–7 | 5512 | 80% Coh |
| 177° C. | MEK, 48 h | 4–6.5 | 4175 | Coh |
| 177° C. | Toluene, 48 h | 4.4–6.3 | 4200 | Coh |
| 177° C. | JP-5, 48 h | 5.5–7 | 4342 | 80% Coh |
| 177° C. | Hydraulic Fluid, 48 h | 6–7 | 4042 | 90% Coh |

TABLE 6

Composite Properties of LaRC ™-8515.[a]

| Theoretical Molecular Weight, $M_n$ | Test Temp., °C. | Short Beam Shear, Strength,[b] Ksi | Flex Strength,[b] Ksi | Flex Modulus,[b] Msi | Open Hole Compression Strength,[c] Ksi |
|---|---|---|---|---|---|
| 8500 | 25 | 18.6 | 280 | 22 | 60.9 |
|  | 93 | 15.4 | 250 | 21 |  |
|  | 150 | 10.7 | 224 | 18 |  |
|  | 177 | 11.2 | 214 | 22 |  |
| 11600 | 25 | 14.8 | 318 | 18 | 56.9 |
|  | 93 | 13.3 | 253 | 21 |  |
|  | 150 | 11.7 | 232 | 23 |  |
|  | 177 | 10.6 | 211 | 22 |  |

[a]Composites processed at 150 psi and 371° C.
[b]Unidirectional specimen layup.
[c]Specimen layup: [±45/90/0/0/±45/0/0/±45/0]$_s$.

TABLE 7

Example 2 Polymer Melt Viscosity at Various Temperatures and Times of LaRC ™-8515.

| Temperature, °C. | Torque, mg after 10 min | Torque, mg after 120 min | Torque, mg after 240 min |
|---|---|---|---|
| 340 | 1500 |  |  |
| 350 | 1000 |  |  |
| 360 | 450 | 700 | 1000 |
| 370 | 350 |  |  |
| 375 | 325 |  |  |

A significant advantage of the copolyimides of the present invention as compared to other linear polyimides is the unique combination of high mechanical properties and ease of processing into useful parts. These copolyimides have excellent solvent resistance, high glass transition temperature and high modulus, but are processable under low pressures and short durations. This combination of properties is unique and is unexpected for these polyimides. The dianhydride used here contains a very rigid biphenyl structure which typically provides polyimides with poor processability. The addition of the highly flexible APB diamine provides the improved processability while the biphenyl structure provides backbone stiffness, improved solvent resistance and improved mechanical properties. These properties are important for applications as films, moldings, adhesives and composites.

BRIEF DESCRIPTION OF THE DRAWING

The sole drawing figure is an equation representing the preparation of a copolyimide according to the present Invention from BPDA and a diamine mixture of 85% ODA and 15% APB.

DESCRIPTION OF THE PREFERRED EMBODIMENTS

According to the present invention, phthalimide-terminated imide oligomers with a wide range of molecular weights (~8500 to ~25,000 g/mole) are readily prepared by offsetting the ratio of one monomer relative to the other by a calculated amount and adding an appropriate amount of a non-reactive endcapper such as phthalic anhydride. The low molecular weight versions of these materials have better processability than the high molecular weight versions; however, the high molecular weight versions have higher Tgs than the low molecular weight versions. Furthermore, copolymers with higher amounts of APB have better processability but lower Tgs while copolymers with higher amounts of ODA have higher Tgs but poorer processability. The temperatures and pressures used to process these materials are limited by the equipment available, while the mechanical properties desired are based on current or future applications. The copolymers of the present invention have a unique combination of properties which allow them to be processed on currently available equipment at very low pressures, while maintaining desired mechanical properties. Therefore, the copolymers of this invention can be provided with the proper combination of properties for the desired application by controlling the ratio of the amine monomers and the molecular weight. Specific examples follow.

EXAMPLES 1
Synthesis of LaRC™-8515 at 8,500 g/mole

The following example illustrates the synthesis of a phthalimide-terminated imide oligomer with theoretical number average molecular weight of 8,500 g/mole. 3,4'-Oxydianiline (ODA) (1.70 mole, 340.42 g) and 1,3-bis(3-aminophenoxy)benzene (APB) (0.30 mole, 87.70 g) were dissolved in N-methylpyrrolidinone (NMP) (~900 mL) in a flask equipped with a mechanical stirrer, condenser and nitrogen inlet. 3,3',4,4'-Biphenyl tetracarboxylic dianhydride (BPDA) (1.8918 mole, 556.61 g) and phthalic anhydride (PA) (0.2164 mole, 32.053 g) were slurried in NMP (~900 mL) and were added to the solution. After washing with ~573 mL of NMP to provide a 30% solids content reaction, an exotherm of 10°–15° C. was observed. The exotherm quickly subsided and the reaction was stirred at 25° C. for 16 hours to form the phthalamide acid-terminated polyamide acid. The inherent viscosity ($n_{inh}$) of the phthalamide acid-terminated polyamide acid was 0.41 dL/g in NMP at 25° C. To imidize, toluene (100 mL) was added and the reaction was heated at 160° C. for 24 hours. After cooling, a powder precipitated which was washed twice in water and dried to afford a yellow solid in high yield. The resulting phthalimide-terminated polyimide was insoluble in NMP and had a glass transition temperature 230° C. A film cast from the polyamide acid solution and dried one hour each at 100°, 225°, and 371° C. had a Tg of 231° C. and was brittle.

EXAMPLE 2
Synthesis of LaRC™-8515 at 9,000 g/mole

The following example illustrates the synthesis of a phthalimide-terminated imide oligomer with theoretical number average molecular weight of 9,000 g/mole. 3,4'-Oxydianiline (ODA) (85.0 mmole, 17.0209 g) and 1,3-bis(3-aminophenoxy)benzene (APB) (15.0 mmole, 4.3850 g) were dissolved in N-methylpyrrolidinone (NMP) (~75 mL) in a flask equipped with a mechanical stirrer, condenser and nitrogen inlet. 3,3',4,4'-Biphenyl tetracarboxylic dianhydride (BPDA) (94.89 mmole, 27.9189 g) and phthalic anhydride (PA) (10.22 mmole, 1.5138 g) were slurried in NMP (~75 mL) and were added to the solution. After washing with ~53 mL of NMP to provide a 20% solids content reaction, an exotherm of 10°–15° C. was observed. The exotherm quickly subsided and the reaction was stirred at 25° C. for 16 hours to form the phthalamide acid-terminated polyamide acid. The inherent viscosity ($n_{inh}$) of the phthalamide acid-terminated polyamide acid was 0.43 dL/g in NMP at 25° C. To imidize, toluene (40 mL) was added and the reaction was heated at 160° C. for 24 hours. After cooling, a powder precipitated which was washed twice in water and dried to afford a yellow solid in high yield. The resulting phthalimide-terminated polyimide was insoluble in NMP, had a glass transition temperature 237° C. and melting endotherms of 324 and 350° C. A film cast from the polyamide acid solution and dried one hour each at 100°, 225°, and 371° C. had a Tg of 235° C. and a Tm at 324° C. and 350° C., and was tough.

EXAMPLE 3
Synthesis of LaRC™-8515 at 11,600 g/mole

The following example illustrates the synthesis of a phthalimide-terminated imide polymer with theoretical number average molecular weight of 11,600 g/mole. 3,4'-Oxydianiline (ODA) (63.75 mmole, 12.7653 g) and 1,3-bis(3-aminophenoxy)benzene (APB) (11.25 mmole, 3.2888 g) were dissolved in N-methylpyrrolidinone (NMP) (~50 mL) in a flask equipped with a mechanical stirrer, condenser and nitrogen inlet. 3,3',4,4'-Biphenyl tetracarboxylic dianhydride (BPDA) (72.0 mmole, 21.1838 g) and phthalic anhydride (PA) (6.0 mmole, 0.8888 g) were slurried in NMP (~50 mL) and were added to the solution. After washing with ~32 mL of NMP to provide a 20% solids content reaction, an exotherm of 10°–15° C. was observed. The exotherm quickly subsided and 25 the reaction was stirred at 25° C. for 16 hours to form the phthalamide acid-terminated polyamide acid. The inherent viscosity ($n_{inh}$) of the phthalamide acid-terminated polyamide acid was 0.47 dL/g in NMP at 25° C. To imidize, toluene (30 mL) was added and the reaction was heated at 160° C. for 24 hours. After cooling, a powder precipitated which was washed twice in water and dried to afford a yellow solid in high yield. The resulting phthalimide-terminated polyimide was insoluble in NMP and had a glass transition temperature 245° C. and a melting point at ~357° C. A film cast from the polyamide acid solution and dried one hour each at 100°, 225°, and 371° C. had a Tg of 248° C. and a Tm at 357° C., and was tough and creasible.

EXAMPLE 4
Synthesis of LaRC™-8515 at 23,4000 g/mole

The following example illustrates the synthesis of a phthalimide-terminated imide polymer with theoretical number average molecular weight of 23,400 g/mole. 3,4'-Oxydianiline (ODA) (42.5 mmole, 8.5105 g) and 1,3-bis(3-aminophenoxy)benzene (APB) (7.5 mmole, 2.1925 g) were dissolved in N-methylpyrrolidinone (NMP) (~35 mL) in a flask equipped with a mechanical stirrer, condenser and nitrogen inlet. 3,3',4,4'-Biphenyl tetracarboxylic dianhydride (BPDA) (49.0 mmole, 14.4170 g) and phthalic anhydride (PA) (2.0 mmole, 0.2962 g) were slurried in NMP (~35 mL) and were added to the solution. After washing with ~32 mL of NMP to provide a 20% solids content reaction, an exotherm of 10°–15° C. was observed. The exotherm quickly subsided and the reaction was stirred at 25° C. for 16 hours to form the phthalamide acid-terminated polyamide acid. The inherent viscosity ($n_{inh}$) of the phthalamide acid-terminated polyamide acid was 0.68 dL/g in NMP at 25° C. To imidize, toluene (30 mL) was added and the reaction was heated at 160° C. for 24 hours. After cooling, a powder precipitated which was washed twice in water and dried to afford a yellow solid in high yield. The resulting phthalimide-terminated polyimide was insoluble in NMP and had a glass transition temperature 248° C. A film cast from the polyamide acid solution and dried one hour each at 100°, 225°, and 371° C. had a Tg of 252° C. and was tough and creasible.

EXAMPLE 5
Synthesis of LaRC™-5050 at 11 600 g/mole

The following example illustrates the synthesis of a phthalimide-terminated imide polymer with theoretical number average molecular weight of 11,600 g/mole. 3,4'-Oxydianiline (ODA) (25.0 mmole, 5.0062 g) and 1,3-bis(3- aminophenoxy)benzene (APB) (25.0 mmole, 7.3084 g) were dissolved in N-methylpyrrolidinone (NMP) (~35 mL) in a flask equipped with a mechanical stirrer, condenser and nitrogen inlet. 3,3',4,4'-Biphenyl tetracarboxylic dianhydride (BPDA) (47.87 mmole, 14.0845 g) and phthalic anhydride (PA) (4.260 mmole, 0.6310 g) were slurried in NMP (~35 mL) and were added to the solution. After washing with ~38 mL of NMP to provide a 20% solids content reaction, an exotherm of 10°–15° C. was observed. The exotherm quickly subsided and the reaction was stirred at 25° C. for 16 hours to form the phthalamide acid-terminated polyamide acid. The inherent viscosity ($n_{inh}$) of the phthalamide acid-terminated polyamide acid was 0.41 dL/g in NMP at 25° C. To imidize, toluene (30 mL) was added and the reaction was heated at 160° C. for 24 hours. After cooling to 25° C., the polymer was still soluble. The solution was poured into water to precipitate a powder which was washed twice in water and dried at >100° C. to afford a yellow solid in high yield. The resulting phthalimide-terminated polyimide was soluble in NMP and had a glass transition temperature of 219° C. A film cast from the polyamide acid solution and dried one hour each at 100°, 225°, and 371° C. had a Tg of 223° C. and was tough and creasible.

EXAMPLE 6
Synthesis of LaRC™-7030 at 11,600 g/mole

The following example illustrates the synthesis of a phthalimide-terminated imide polymer with theoretical number average molecular weight of 11,600 g/mole. 3,4'-Oxydianiline (ODA) (35.0 mmole, 7.0086 g) and 1,3-bis(3-aminophenoxy)benzene (APB) (15.0 mmole, 4.3850 g) were dissolved in N-methylpyrrolidinone (NMP) (~35 mL) in a flask equipped with a mechanical stirrer, condenser and nitrogen inlet. 3,3',4,4'-Biphenyl tetracarboxylic dianhydride (BPDA) (47.95 mmole, 14.1075 g) and phthalic anhydride (PA) (4.104 mmole, 0.6079 g) were slurried in NMP (~35 mL) and were added to the solution. After washing with ~34 mL of NMP to provide a 20% solids content reaction, an exotherm of 10°–15° C. was observed. The exotherm quickly subsided and the reaction was stirred at 25° C. for 16 hours to form the phthalamide acid-terminated polyamide acid. The inherent viscosity ($n_{inh}$) of the phthalamide acid-terminated polyamide acid was 0.49 dL/g in NMP at 25° C. To imidize, toluene (30 mL) was added and the reaction was heated at 160° C. for 24 hours. After cooling to 25° C., the polymer was still soluble. The solution was poured into water to precipitate a powder which was washed twice in water and dried at >100° C. to afford a yellow solid in high yield. The resulting phthalimide-terminated polyimide was soluble in NMP and had a glass transition temperature of 230° C. A film cast from the polyamide acid solution and dried one hour each at 100°, 225°, and 371° C. had a Tg of 230° C. and was tough and creasible.

EXAMPLE 7
Synthesis of LaRC™-955 at 11,600 g/mole

The following example illustrates the synthesis of a phthalimide-terminated imide polymer with theoretical number average molecular weight of 11,600 g/mole. 3,4'-Oxydianiline (ODA) (47.5 mmole, 9.5117 g) and 1,3-bis(3-aminophenoxy)benzene (APB) (2.50 mmole, 0.7308 g) were dissolved in N-methylpyrrolidinone (NMP) (~35 mL) in a flask equipped with a mechanical stirrer, condenser and nitrogen inlet. 3,3',4,4'-Biphenyl tetracarboxylic dianhydride (BPDA) (48.043 mmole, 14.1354 g) and phthalic anhydride (PA) (3.914 mmole, 0.5797 g) were slurried in NMP (~35 mL) and were added to the solution. After washing with ~30 mL of NMP to provide a 20% solids content reaction, an exotherm of 10°–15° C. was observed. The exotherm quickly subsided and the reaction was stirred at 25° C. for 16 hours to form the phthalamide acid-terminated polyamide acid. The inherent viscosity ($n^{inh}$) of the phthalamide acid-terminated polyamide acid was 0.54 dL/g in NMP at 25° C. To imidize, toluene (30 mL) was added and the reaction was heated at 160° C. for 24 hours. After cooling, a powder precipitated which was washed twice in water and dried to afford a yellow solid in high yield. The resulting phthalimide-terminated polyimide was insoluble in NMP and had a glass transition temperature 253° C. and melting endotherms at ~340 and ~373° C. A film cast from the polyamide acid solution and dried one hour each at 100°, 225°, and 371° C. had a Tg of 253° C. and a Tm at 340° C. and 373° C., and was tough and creasible.

EXAMPLE 8
Preparation of Moldings

The following process was used to test the compression molding of polyimides prepared according to the previous examples. Dried powders of the polyimide copolymers (1 gram) were placed in a 1.25 inch square stainless steel mold which was placed in a preheated hydraulic press. The molds were heated to 371° C. and pressure was applied. The pressure and temperature were held constant for 0.5 hours. The results are presented in Table 3. Poor processability means inadequate flow and an unconsolidated molding, good processability means a consolidated molding but little molding flash, and excellent processability means a well consolidated molding with a lot of molding flash (which indicates that lower pressures would probably provide good moldings).

EXAMPLE 9
Preparation of Adhesive tape

Solutions of the compositions of Examples 2 and 3, i.e. 20% solids in NMP, were used to prepare adhesive tapes as follows. The solutions were applied to style 112, A1100 finish E-glass cloth which had been dried for 0.5 hours in a forced air oven. The coated cloths were air dried one hour each at 100°, 175° and 225° C. between application of subsequent coats. This procedure was continued until a nominal thickness of 0.012 inch was obtained. The area to be bonded was coated (primed) on each adherend with a dilute solution (~5% solids) of the same composition as the adhesive tape and air dried one hour each at 100°, 175° and 225° C. prior to bonding with the adhesive tape.

Example 10
Adhesive Bonding

The prepared adhesive tapes from Example 9 were cut into strips sufficient to cover the bond area so as to give a 0.5 inch overlap for surface-treated (Pasa Jell 107) titanium alloy (Ti-6AI-4V) four fingered panel adherends. Each tape was placed between the overlapped panels and the specimens were assembled in a bonding jig in such a manner as to hold the specimens securely while being bonded. The assembly was placed in a hydraulic press and 85 to 150 psi pressure was applied. The temperature, monitored by a thermocouple, was increased from room temperature to 371° C. during ~45 minutes and held for one hour while pressure was maintained. The heat was turned off and the press was allowed to cool under pressure to <150° C. The bonded panel was removed from the press and jig, and the individual specimens were separated with a metal shearer. The lap shear strengths were determined according to the procedure for ASTM-1002. Results are given in Table 5.

EXAMPLE 11
Preparation of Graphite Fiber with Polymer Coating

A solution of polymer from Example 3 was coated onto continuous graphite fiber (Hercules, Inc., IM-7). After coating, the wet fiber was dried in an oven to remove most of the solvent and convert to poly(amide) acid to polyimide. The polymer-solids-to-graphite-fiber ratio was approximately one to two. This prepreg was held for composite fabrication.

EXAMPLE 12
Preparation of Graphite Fiber Reinforced Composite

The prepreg from Example 11 was cut into three inch square pieces and placed in a three inch by three inch matched-metal-die mold with the fiber all aligned in the same direction(unidirectional). Ten plies of the prepreg were stacked in this manner and the mold was placed in a heated hydraulic press. The mold was heated to 225° C. for one hour, then heated to 371° C. with 200 psi pressure applied after 5 minutes at 371° C., and held for one hour at 371° C. After cooling to ambient conditions, the pressure was released and a well consolidated composite part was removed from the mold. The resin content of the molded composite was calculated to be approximately 33 percent.

EXAMPLE 13
Measurement of Melt Viscosity and Melt Stability

The polyimide copolymers according to the present invention were subjected to melt rheology measurements using the Rheometrics System IV rheometer and a Brabender equipped with a Mixer Measuring Head. Both techniques indicate that these copolymers have low melt viscosities and excellent melt stabilities when heated to and held at the temperatures necessary to process into useful parts. Data for the polymer described in Example 2 from the Brabender is presented in Table 7. Torque is a measure of the force needed to mix the polymers and is directly related to viscosity at the temperatures shown.

EXAMPLE 14
Preparation of Plate Coating.

Phthalamide acid-terminated polyamide acid solutions according to the present invention were poured onto glass plates and spread to a uniform thickness using a doctor blade with a preset gap. After drying to a tack free form in a dust free atmosphere, the polymers were heated one hour each at 100°, 200° and 300° C. to form a polyimide coating with high adhesion to the glass plate.

EXAMPLE 15
Preparation of Wire Coating.

Steel and copper wires were dipped into phthalamide acid-terminated polyamide acid solutions according to the present invention and removed to form a polymer/solvent coating on the wires. After drying to a tack free form in a dust free atmosphere, the polymers were heated one hour each at 100°, 200° and 300° C. to form a tough, flexible, polyimide coating with high adhesion to the steel or copper wire.

I claim:

1. A polyimide copolymer prepared by reacting a mixture of 3,4'-oxydianiline (ODA) and 1,3-bis(3-aminophenoxy) benzene (APB) with 3,3',4,4'-biphenylcarboxylic dianhydride (BPDA) and terminating the reaction with an effective amount of a non-reactive endcapper.

2. A polyimide copolymer according to claim 1, wherein the mixture of ODA and APB has a ratio of ODA to APB within the range of about 95:5 to about 50:50.

3. A polyimide copolymer according to claim 2, wherein the ratio of ODA to APB is about 85:15.

4. A polyimide copolymer according to claim 2, wherein the non-reactive endcapper is a member selected from the group consisting of monofunctional anhydrides and monofunctional amines.

5. A polyimide copolymer according to claim 4, wherein the monofunctional anhydride is phthalic anhydride.

6. A polyimide copolymer according to claim 2, wherein the polyimide copolymer has a molecular weight within the range of about 8500 to about 25,000 g/mole.

7. A polyimide copolymer according to claim 6, wherein the molecular weight is between about 9000 and 12,000 g/mole.

8. A molding prepared from a polyimide copolymer according to claim 1.

9. A film prepared from a polyimide copolymer according to claim 1.

10. An adhesive prepared from a polyimide copolymer according to claim 1.

11. A graphite composite prepared from a polyimide copolymer according to claim 1.

12. A plate coating composition prepared from a polyimide copolymer according to claim 1.

13. A wire coating composition prepared from a polyimide copolymer according to claim 1.

* * * * *